United States Patent [19]
Sawano et al.

[11] Patent Number: 5,124,862
[45] Date of Patent: Jun. 23, 1992

[54] TAPE LOADING MECHANISM FOR MAGNETIC RECORDING AND REPRODUCING DEVICES

[75] Inventors: Toshiyasu Sawano, Fujisawa; Kenji Ogiro, Yokohama; Kyuichirou Nagai, Fujisawa, all of Japan

[73] Assignee: Hitachi, Ltd., Tokyo, Japan

[21] Appl. No.: 409,430

[22] Filed: Sep. 19, 1989

[30] Foreign Application Priority Data

Sep. 30, 1988 [JP] Japan .................. 63-244090

[51] Int. Cl.⁵ .................. G11B 15/66; G11B 5/08
[52] U.S. Cl. .................. 360/85; 360/95
[58] Field of Search .................. 360/85, 95

[56] References Cited

U.S. PATENT DOCUMENTS

| | | | |
|---|---|---|---|
| 4,595,961 | 6/1986 | Kuwajima | 360/85 |
| 4,807,077 | 2/1989 | Zaitsu et al. | 360/85 |

FOREIGN PATENT DOCUMENTS 62-232750 10/1987 Japan .

*Primary Examiner*—David J. Severin
*Attorney, Agent, or Firm*—Fay, Sharpe, Beall, Fagan, Minnich & McKee

[57] ABSTRACT

A tape loading mechanism for a magnetic recording and reproducing device to pull out a magnetic tape from a tape cassette containing the magnetic tape to wind the magnetic tape for a predetermined winding angle around a rotating cylinder having a rotating head mounted thereon comprising an incoming-side tape pull-out guide device for pulling out the magnetic tape from the tape cassette to form an incoming-side portion of a tape running path, the incoming-side tape pull-out device having a plurality of tape guides which engage with the magnetic tape; first outgoing-side tape pull-out guide device for pulling out the magnetic tape from the tape cassette and winding the tape for a predetermined angle around the rotating cylinder, the first outgoing-side tape pull-out guide device having a first inclined tape guide to change the running direction of the magnetic tape upwardly; and second outgoing-side tape pull-out guide device for forming an outgoing-side portion of the tape running path in cooperation with the first outgoing-side tape pull-out guide device, the second outgoing-side tape pull-out guide device having a second inclined tape guide always located outside the tape cassette to engage with a magnetic surface side of the magnetic tape running from the first inclined tape guide to return the running direction of the tape to the height of the tape cassette. cooperation with the first outgoing-side tape pull-out guide device, the second outgoing-side tape pull-out guide device having a second inclined tape guide always located outside the tape cassette to engage with a magnetic surface side of the magnetic tape running from 4 Claims, 8 Drawing Sheets

TAPE LOADING MECHANISM FOR MAGNETIC RECORDING AND REPRODUCING DEVICES

BACKGROUND OF THE INVENTION

This invention relates to a compact magnetic recording and reproducing device and more particularly to a tape loading mechanism which prevents damage to the tape.

In prior art magnetic recording and reproducing devices, a tape loading mechanism, as described in Japanese Patent Unexamined Publication No. 62-232750, is constructed such that a plurality of tape pull-out guide means, including tape pull-out guide means having an inclined tape guide, are inserted into an opening of a tape cassette when the tape cassette is loaded. The individual guides come into contact with a tape at a base surface side thereof and pull out the tape from the cassette and wind the tape around a cylinder having a rotating head mounted thereon, thus forming a predetermined tape running path.

In the above-mentioned prior art, consideration was not given to the positions of the plurality of tape guides in the process of forming the tape running path. In consequence, the magnetic tape is pulled out of the tape cassett such that its height gradually varies when wound around the rotating cylinder for a predetermined range of winding angle, and thus the tape is twisted due to the different attitude of the tape guides and comes to assume unnatural attitude between the tape guides. As a result, the magnetic tape is subjected to immoderate forces and damaged results.

In addition, prior art tape loading mechanisms are arranged such that after a plurality of tape pull-out guide means including a tape pull-out guide means having an inclined tape guide are all inserted into an opening of the tape cassette upon loading of the cassette, the individual tape guides come into contact with the tape at the base surface side thereof. When the space of the opening of the tape cassette was reduced in response to the size reduction of the magnetic recording and reproducing devices, the tape pull-out guide means cannot be inserted into the opening of the cassette, and even if they could be inserted, they interfere with one another during the tape loading, making it difficult to obtain smooth operation.

SUMMARY OF THE INVENTION

An object of this invention is to provide a tape loading mechanism for magnetic recording and reproducing devices which inhibits tape twisting during the tape loading and thus prevent the tape from being damaged.

Another object of this invention is to provide a tape loading mechanism compatible with the reduction in size of the magnetic recording and reproducing devices.

A tape loading mechanism for a magnetic recording and reproducing device to pull-out a magnetic tape from a tape cassette containing the magnetic tape to wind the magnetic tape for a predetermined winding angle around a rotating cylinder having a rotating head mounted thereon according to the invention comprises:

incoming-side tape pull-out guide means for pulling out the magnetic tape from the tape cassette to form an incoming-side portion of a tape running path located between a tape incoming side of the rotating cylinder and the tape cassette upon loading the tape, said incoming-side tape pull-out means having a plurality of tape guides which are inserted into an opening of the tape cassette and which engage with the base side of the magnetic tape;

first outgoing-side tape pull-out guide means for pulling out the magnetic tape from the tape cassette and winding the tape for a predetermined angle around the rotating cylinder in a spiral path upon loading the tape, said first outgoing-side tape pull-out guide means having a first inclined tape guide to change the running direction of the magnetic tape upwardly; and second outgoing-side tape pull-out guide means for forming an outgoing-side portion of the tape running path between the tape outgoing side of the rotating cylinder and the tape cassette in cooperation with said first outgoing-side tape pull-out guide means, said second outgoing-side tape pull-out guide means having a second inclined tape guide located outside the tape cassette to engage with a magnetic surface side of the magnetic tape running from the first inclined tape guide to return the running direction of the tape to the height of the tape cassette.

The second outgoing-side pull-out guide means is structured so as to reach the tape loading finished position before the incoming-side tape pull-out guide means and the first outgoing-side tape pull-out guide means reach the tape loading finished position.

The second outgoing-side pull-out guide means includes a vertical tape guide which change the running direction of the magnetic tape towards the tape cassette and the second inclined tape guide and an outgoing-side correction height regulating tape guide are pivotally arranged about a shaft disposed coaxially with the vertical tape guide.

The second inclined tape guide and the outgoing-side correction height regulating tape guide are pivotted upon an auxiliary base plate which moves the tape cassette mounted thereon close to the rotating cylinder.

BRIEF DESCRIPTION OF THE DRAWINGS

FIGS. 13a and 13b are plan views of modifications of the second outgoing-side tape pull-out guide means, wherein FIG. 13a shows a condition during tape loading and FIG. 13b shows a completed condition of tape loading.

DESCRIPTION OF THE PREFERRED EMBODIMENTS

Figure 1:
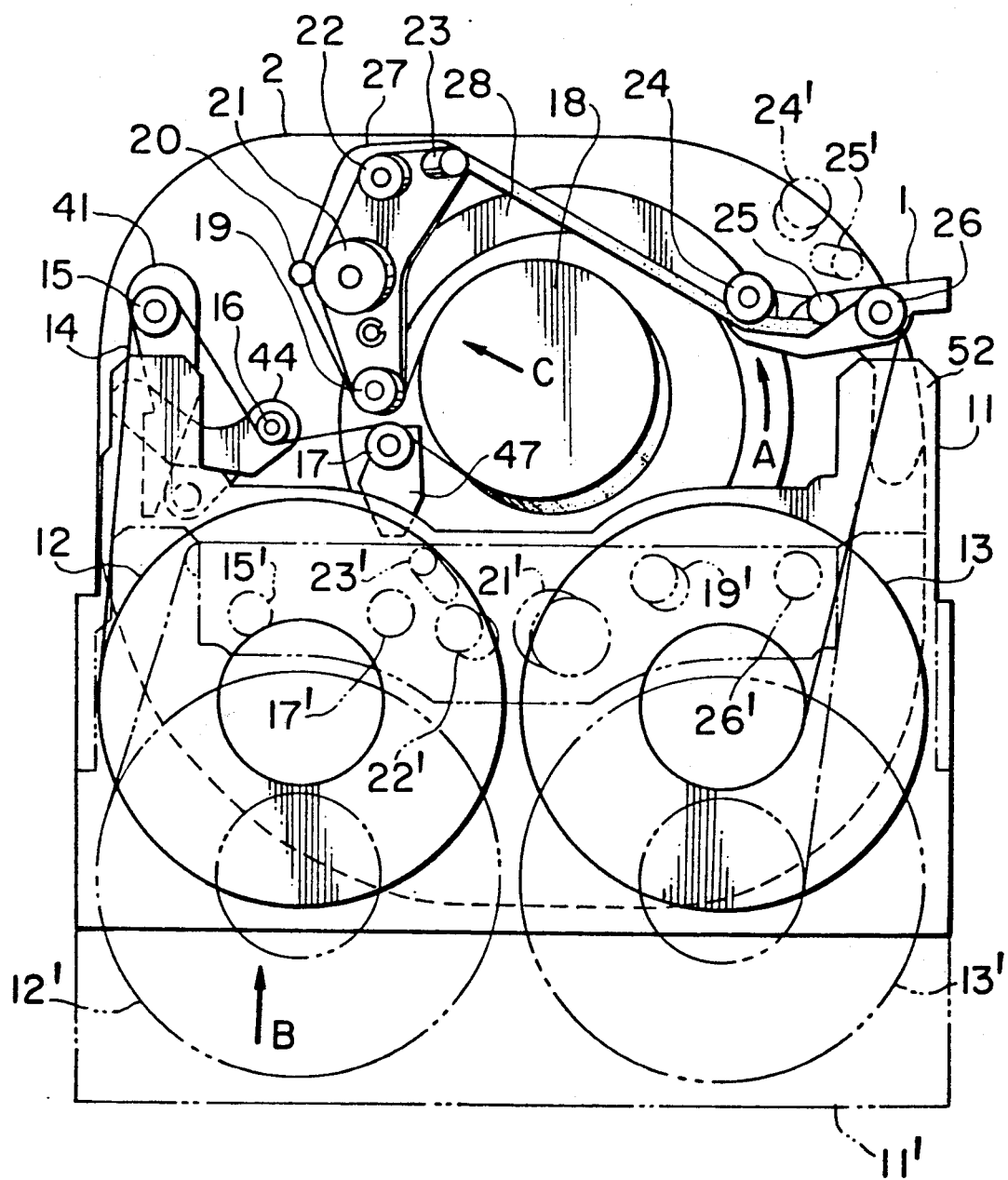
FIG. 1 is a schematic plan view of a tape loading mechanism for magnetic recording and reproducing devices according to the invention, with an upper plate of a tape cassette being removed for explanation purposes.
Figure 2:
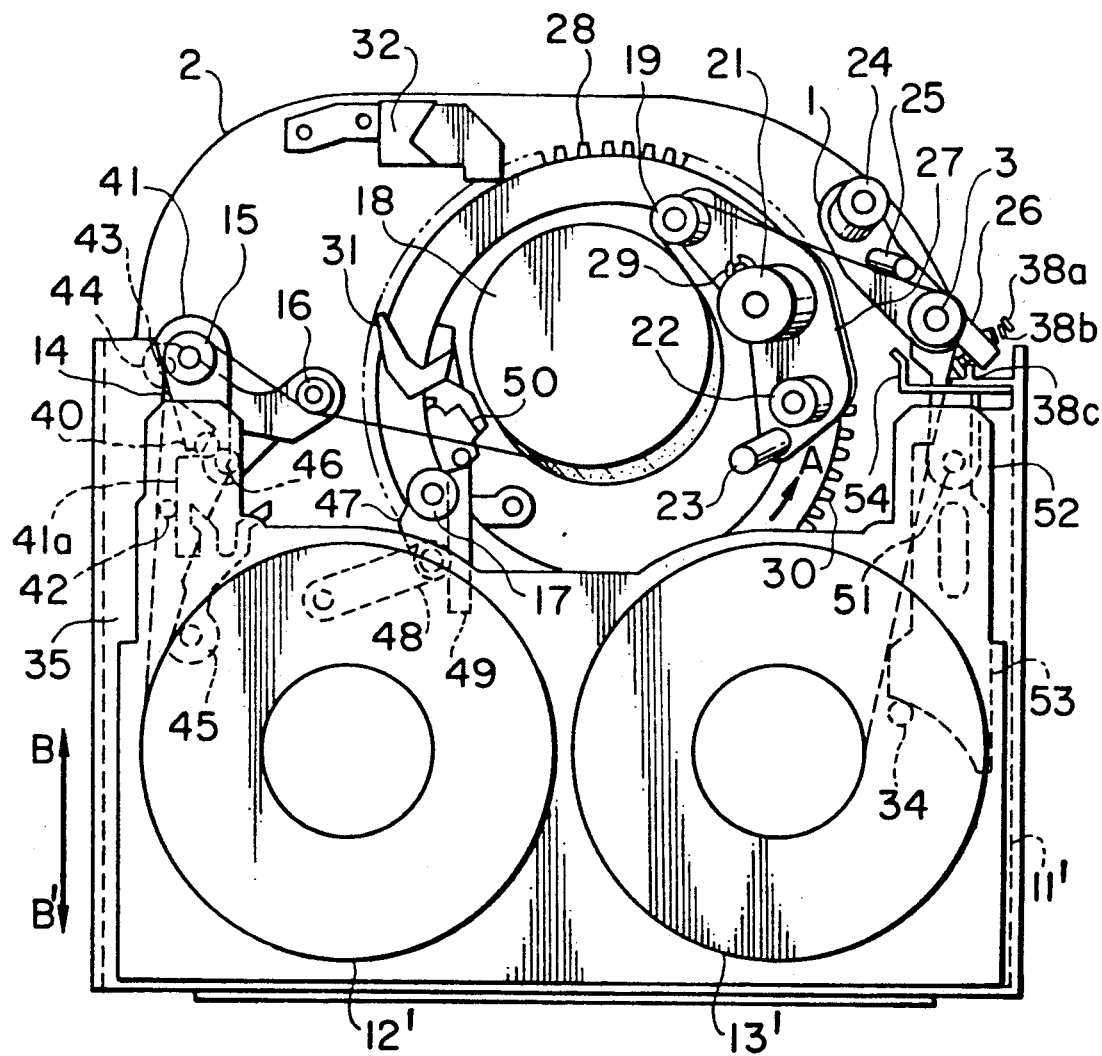
FIG. 2 is a plan view of the tape loading mechanism according to the invention showing a condition during tape loading.

With reference to FIGS. 1 and 2, the outline of the tape loading mechanism will be described briefly. A magnetic tape 14 pulled out of a supply reel 12 in a tape cassette 11 is passed by way of an incoming-side tape guide 15 stood on an incoming-side guide arm 41, a tension pin 16 stood on the second tension arm 44, and an incoming-side height regulating tape guide 17 stood on an incoming-side base 47. Then, the tape is wound around a rotating cylinder 18 for a predetermined winding angle (270°) and is passed by way of an outgoing-side first height regulating tape guide 19 stood on an outgoing-side base 27, a pinch roller 21, an outgoing-side second height regulating tape guide 22, a first inclined tape guide 23, an outgoing-side correction height regulating tape guide 24 stood on a correcting guide base 1, a second inclined tape guide 25, and an outgoing-side tape guide 26 stood on an outgoing-side guide arm 52. The tape 14 is pinched by a capstan 20 and the pinch roller 21 and driven at a fixed speed, and wound around a take-up reel 13 in the tape cassette 11. In this case, before the start of tape loading, the tape cassette and the tape guides are located in the positions indicated by the imaginary lines. The outgoing-side base 27, which is pivotally supported on a loading ring 28 provided around the rotating cylinder 18, is led by the rotation of the loading ring 28 in the direction of the arrow A to a predetermined loading complete position. An incoming-side guide arm 41, which is journaled on an auxiliary base plate 35, is rotated by the movement of the auxiliary base plate 35 in the direction of the arrow B in the tape loading process and reaches a predetermined loading complete position. On the other hand, a second tension arm 44, the correcting base 1, and the outgoing-side guide arm 52 are journaled on the base plate 2 and as they rotate, they are led to their loading complete positions.

On the supply reel side or incoming side the magnetic tape 14 is pulled out from the tape cassette 11 so as to be parallel with the base plate 2 and wound around the rotating cylinder 18. The magnetic tape 14 is wound around the cylinder in a spiral form at a predetermined lead angle. For this purpose, the rotating cylinder 18 is arranged to be inclined at the lead angle to a direction parallel with the incoming direction of the tape towards the cylinder, namely, in the direction of the arrow C. Since the magnetic tape 18 is wound in a spiral form so as to assume a lower position at the outgoing side than the incoming side, the magnetic tape 14 coming out of the rotating cylinder 18 is made to change its running direction while subjected to tape-height regulation by the outgoing-side first height regulating tape guide 19, and the tape runs upwardly with respect to the base plate 2 and reaches the first inclined tape guide 23. The first inclined tape guide 23 is inclined at a predetermined angle so that the tape running direction complies with a direction toward the outgoing-side correction height regulating tape guide 24. The second inclined tape guide 25 has a function to change the running direction of the tape so that the magnetic tape 14 coming out of the outgoing-side correction height regulating tape guide 24 runs in parallel with the base plate 2. Therefore, the tape coming out of the second inclined tape guide has had its twist corrected and now runs at the same height as on the take-up reel 13, and after passing through the outgoing-side tape guide 26, the tape is wound around the take-up reel 13.

In the above description, the incoming-side tape guide 15 and the incoming-side height regulating tape guide 17 are tape pull-out guide means arranged on the tape incoming side of the rotating cylinder 18, while the outgoing-side first height regulating tape guide 19, the pinch roller 21, the outgoing-side second height regulating tape guide 22, the first inclined tape guide 23, and the outgoing-side tape guide 26 are the first tape pull-out guide means arranged on the tape incoming side of the rotating cylinder 18. In addition, the outgoing-side correction height regulating tape guide 24 and the second inclined tape guide 25 are the second tape pull-out guide means arranged on the tape outgoing side of the cylinder.

FIG. 2 shows a condition on the way of tape loading. An auxiliary base plate 35 is mounted on the base plate 2 movably in the direction of the arrow B(B'). When a tape cassette 11 is loaded on the auxiliary base plate 35, the auxiliary base plate 35 moves in the direction of the arrow B in a manner to cause the depth of the mechanism to be reduced by an overlap between the rotating cylinder 18 and the opening of the tape cassette 11.

The incoming-side tape guide 15 is stood on one end of the incoming-side guide arm 41 supported rotatably by a shaft 40 mounted on the auxiliary base plate 35. The edge 41a of the incoming-side guide arm 41 is always kept in contact with a shaft 42 on the base plate 2 by the urging force of a spring, not shown. By the movement of the auxiliary base plate 35 in the direction of the arrow B, the incoming-side guide arm 41 is rotated about the shaft 40, causing the incoming-side tape guide 15 to move to a predetermined position. The tension pin 16 is provided on one end of the second tension arm 44 rotatably supported by a shaft 43 mounted on the base plate 2. When the tape loading has been completed, the second tension arm 44 is connected with the first tension arm 45, rotatably journaled on the auxiliary base plate 35, by a connecting pin 46 mounted on the second tension arm 44. The tape tension is controlled by the interlocked movement of the first tension arm 45 and the second tension arm 44. The incoming-side height control tape guide 17 is mounted on an incoming-side base 47. The incoming-side base 47 is supported by an incoming-side base arm 48 rotatably mounted on the base plate 2 and is moved along a guide member 49 by the movement of the auxiliary base plate 35 in the direction of the arrow B. The position of the incoming-side height regulating tape guide 17 is regulated by a position regulating member 50 so that the incoming-side height regulating tape guide 17 is located in a predetermined position.

The outgoing-side first height regulating tape guide 19, the pinch roller 21, the outgoing-side second height regulating tape guide 22 and the first inclined tape guide 23 are mounted on the outgoing-side base 27. The outgoing-side base 27 is mounted such that it can rotate about the axis 29 fixed to the loading ring 28. Prior to tape loading, a group of those tape guides mounted on the outgoing-side base 27 are located inside the opening of the tape cassette 11. The loading ring 28 has gear teeth 30 formed around the outer periphery thereof. The loading ring 28 is moved in the direction of the arrow A as the driving force of a tape loading motor 55a (FIG. 3) is transmitted to the gear teeth 30. Accordingly, the outgoing-side base 27 moves along the periphery of the rotating cylinder 18. The loading ring 28 is inclined to allow the outgoing-side base 27 to lower to a predetermined position as the outgoing-side base 27 turns around and is supported on the base plate 2 through a holding roller 60 (FIG. 4). While the outgoing-side base 27 moves along the periphery of the rotating cylinder 18 together with the rotating movement of the loading ring 28, the outgoing-side base 27 is also rotated around the shaft 29 with its rotating path being determined by a configuration of the first position regulating member 31, which will be further described later. Furthermore, the position of the outgoing-side base 27 is regulated by the first position regulating member 31 and the second position regulating member 32.

On the other hand, the outgoing-side correction height regulating tape guide 24 and the second inclined tape guide 25 are mounted on the correcting base 1. The correcting base 1 is mounted rotatably about the shaft 3 fixed to the base plate 2.

The outgoing-side tape guide 26 is mounted on one end of the outgoing-side guide arm 52 rotatably supported by a shaft 51 attached to the base plate 2. This outgoing-side guide arm 52 is turned by a slider 53 which is moved by a pin 34 on a cam gear, not shown. The outgoing-side guide arm 52 is stopped at a predetermined position by a position regulating member 54 fixed to the auxiliary base plate 35.

Figure 3:
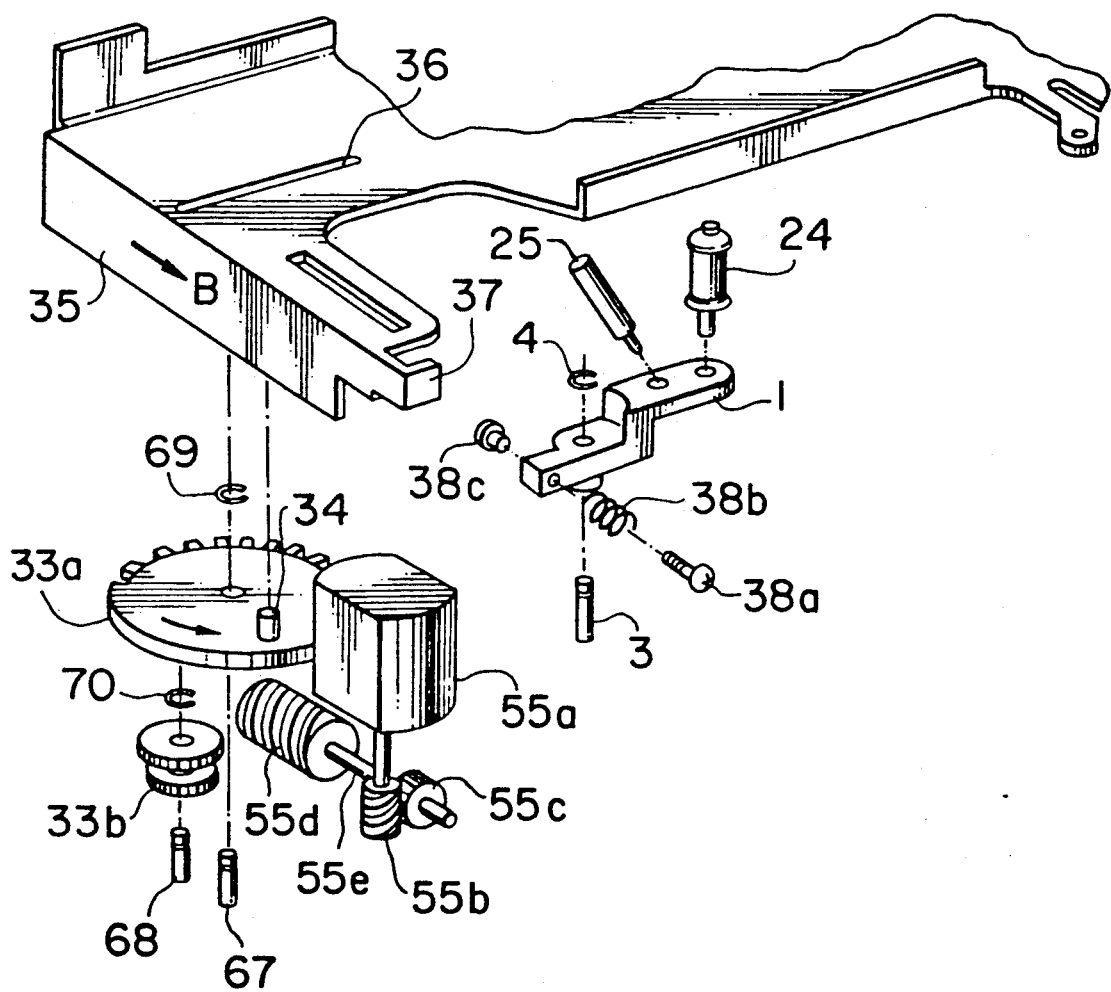
FIG. 3 is an exploded view in perspective of a mechanism for rotating the correcting base and the second inclined tape guide.
Figure 4:
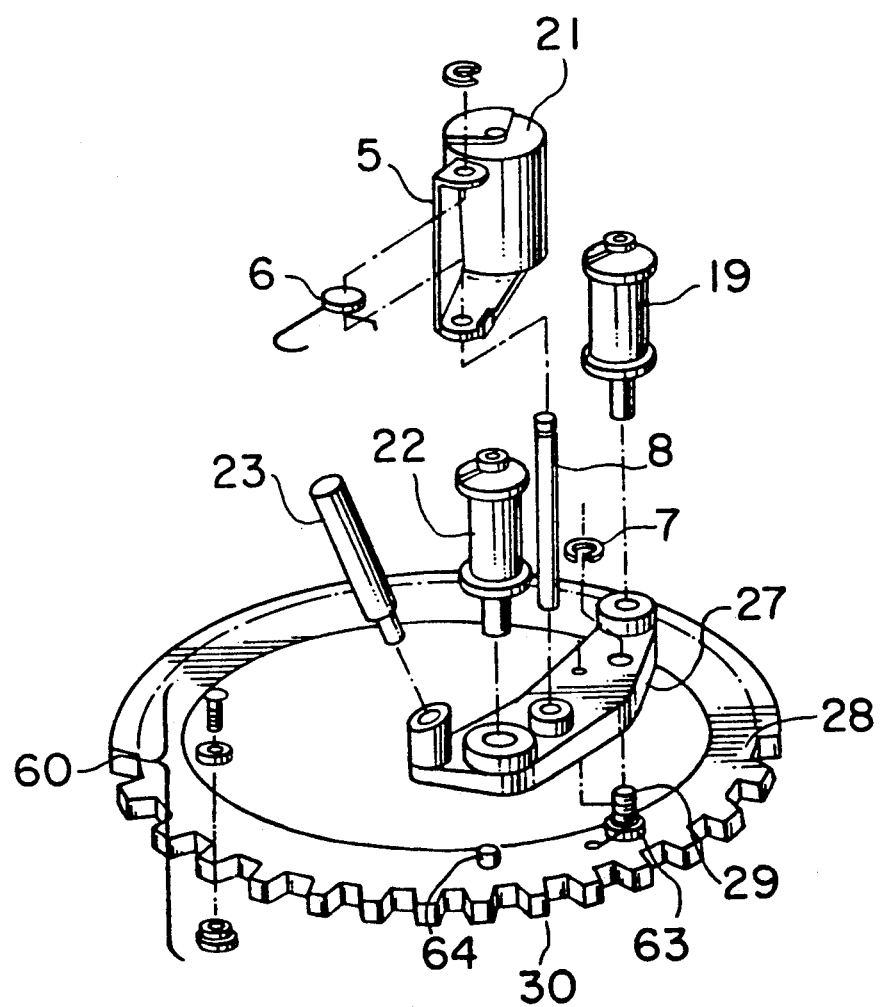
FIG. 4 is an exploded view in perspective of the first outgoing-side tape pull-out guide means.

Referring to FIG. 3, the turning movement of the outgoing-side correction height regulating tape guide 24 and the second inclined tape guide 25 will be described in detail.

The driving force of the loading motor 55a is transmitted by gears 55b, 55c 55d and a shaft 55e to the gear 33b. The gear 33b, supported by a shaft 68 on the base plate 2, meshes with a gear, not shown, which is provided on the reverse side of the cam gear 33a supported by a shaft 67. The cam gear 33a is turned by the rotation of the gear 33b. The pin 34 stood on the cam gear 33a engages into a cam groove 36 provided in the auxiliary base plate 35. Consequently, as the pin 34 is moved by the rotation of the cam gear 33a, the auxiliary base plate 35 is moved in the direction of the arrow B. On the other hand, at the extremity of the auxiliary base plate 35, there is provided a protruding portion 37 as shown in FIG. 3. While the auxiliary base plate 33 is moved, the protruding portion 37 abuts with an adjusting cap 38c set in the extremity of an adjusting screw 38a which is biased by a spring 38b with respect to the correcting base 1. Therefore, as the auxiliary base plate 35 is moved, the correcting base 1 is rotated, in which turning movement, the outgoing-side correction height regulating tape guide 24 and the second inclined tape guide 25, both mounted on the correcting base, make predetermined loading motions.

With reference to FIG. 4, the rotating movements of the tape guides on the outgoing-side base 27 will now be described in detail. As mentioned above, the cam gear 33a is rotated by the driving force from the loading motor 55a, and the rotation is transmitted by transmitting means such as a gear train, not shown, to the geared portion 30 of the loading ring 28, thereby to be rotated. The holding roller 60 is journaled rotatably on a cylinder base, not shown, which is mounted on the base plate 2. The holding roller 60 holds the loading ring 28 at the inner periphery thereof. The outgoing-side base 27 is journaled rotatably by the shaft 29 on the loading ring 28 and a ring 7. The outgoing-side base 27 is given an urging force in the clockwise direction by an urging spring 63, and the rotating range of the outgoing-side base 27 is limited by abutting with a stopper 64 provided on the loading ring 28. The outgoing-side height regulating tape guide 19, the outgoing-side second height regulating tape guide 22, the first inclined tape guide 23, and the shaft 8 are mounted on the outgoing-side base 27. The holder 5 of the pinch roller 21 is supported by the shaft 8. The pinch roller 21 is fitted over a shaft provided in the holder 5 and held rotatably thereby. The holder, which has an urging spring 6 mounted thereto, is pressed against a capstan, not shown, by the turning force of the loading ring 28 when the magnetic tape is running. As the loading ring 28 rotates, the tape guides on the outgoing-side base 27 pull the magnetic tape out, and the outgoing-side base 27 turns around the shaft 29 and along the first position regulating member (FIG. 2), eventually the tape guides being positioned in the loading complete position as described above.

Figure 5:
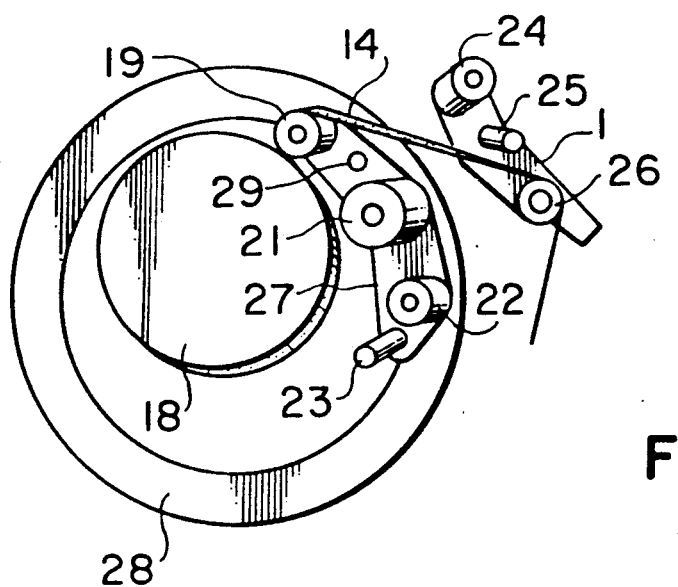
FIGS. 5 through 7 are plan views respectively showing conditions in the tape loading process.

The method of controlling the position of the tape during tape loading will next be described. FIG. 5 shows a condition in which the tape guides on the outgoing-side base 27 have started drawing the magnetic tape 14 out on the way of tape loading. At this time, in order to wind the magnetic tape 14 aslant around the cylinder 18 along the lead thereof, the outgoing-side base 27 is beginning to go down along the inclination of the lead. The outgoing-side correction height regulating tape guide 24 and the second inclined tape guide 25 on the correcting base 1 are off a line connecting between the outgoing-side first height regulating tape guide 19 and the outgoing-side tape guide 26 on the outgoing-side base 27.

Figure 6:
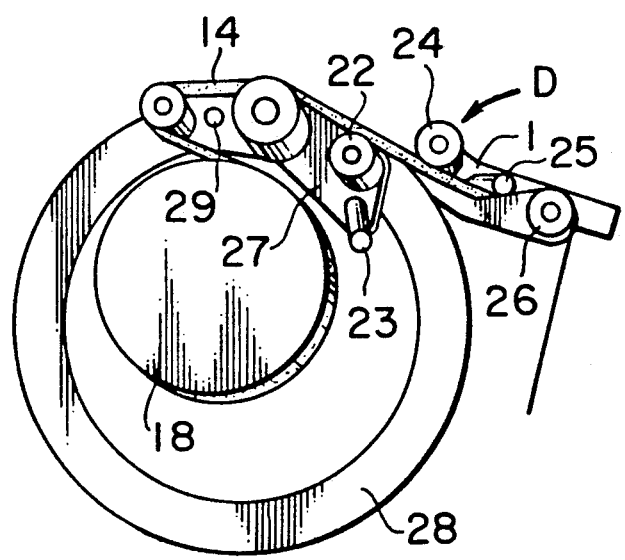

As shown in FIG. 6, from the above-mentioned condition, the outgoing-side base 27 moves with the rotation of the loading ring 28. As described earlier, the auxiliary base plate 35 (FIG. 3) moves too and the protruding portion 37 thereof is pressed against the adjusting mechanism of the correcting base 1, causing the correcting base 1 to turn around the shaft 3 in the counterclock direction (the arrow D) in FIG. 6. By this turning of the correcting base 1, the outgoing-side correction height regulating tape guide 24 and the second inclined tape guide 25 on the correcting base 1 get in between the outgoing-side second height regulating tape guide 22 and the outgoing-side tape guide 26, and come into contact with the magnetic tape 14. With progress in the descent of the tape guides on the outgoing-side base 27 to form a tape running path, the magnetic tape 14 is twisted in a great measure downwardly between the outgoing-side tape guide 26 disposed at the same height as the tape cassette and the tape guides on the outgoing-side base 27. At this time, in the magnetic tape 14, there is produced a downward moving force due to the attitude of the tape guides on the outgoing-side base 27. Against this, the outgoing-side correction height regulating tape guide 24 and the second inclined tape guide 25 serve to correct the attitude of the magnetic tape 14 and reduce the downward moving force of the magnetic tape 14, produced by the tape guides on the outgoing-side base 27.

The tape guides 24, 25 on the correcting base 1 are arranged to turn around the axis of the outgoing-side tape guide 26. Therefore, the relative attitude of the magnetic tape 14 between the outgoing-side correction height regulating tape guide 24 and the outgoing-side tape guide 26 remains unchanged at all times. As the magnetic tape 14 engages with the tape guides 24, 25 on the correcting base 1, the downward twist of the tape is reduced.

Figure 7:
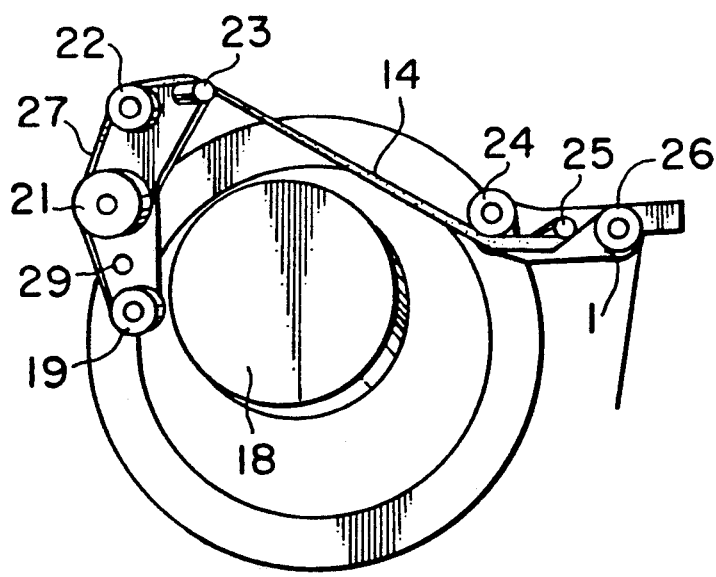

As shown in FIG. 7, the outgoing-side base 27 further goes down, and when the extreme end of the outgoing-side base 27 abuts to the first position regulating member 31 (FIG. 2), the outgoing-side base 27 turns in the counterclockwise direction in FIG. 7 around the shaft 29 as the center of turning, while the extreme end thereof traces the edge of the first position regulating member 31. By this turning of the outgoing-side base 27, the first inclined tape guide 23 on the outgoing-side base 27 is interposed between the outgoing-side second height regulating tape guide 22 and the outgoing-side correction height regulating tape guide 24, and comes into contact with the magnetic tape 14. The first inclined tape guide 23 delivers the magnetic tape 14 which has engaged with the second height regulating tape guide 22 to the outgoing-side correction height regulating tape guide 24 in such a way as not to give a twist to the magnetic tape 14. While the first inclined tape guide 23 corrects the deviation in height of the magnetic tape 14, the tape guides reach the respective predetermined positions, and the tape loading is completed. The tape attitude during tape loading can be stabilized by causing the outgoing-side base 27 and the correcting base 1 rotate separately and setting adequately winding angles of the tape at the first inclined tape guide 23 and the second inclined tape guide 25. This will be further described with reference to FIGS. 8a and 8b.

Deviation of the center-height position of the magnetic tape 14 from the center-height positions of the tape guides occurs due to some factors, including the positions, inclinations and inclination directions of the tape guides during tape loading. When the correcting base 1 turns in the course of tape loading, the winding angles of the magnetic tape 14 at the outgoing-side correction height regulating tape guide 24 and the second inclined tape guide 25 vary, thus causing the amount of the above-mentioned height deviation of the magnetic tape 14 vary.

Figure 8A:
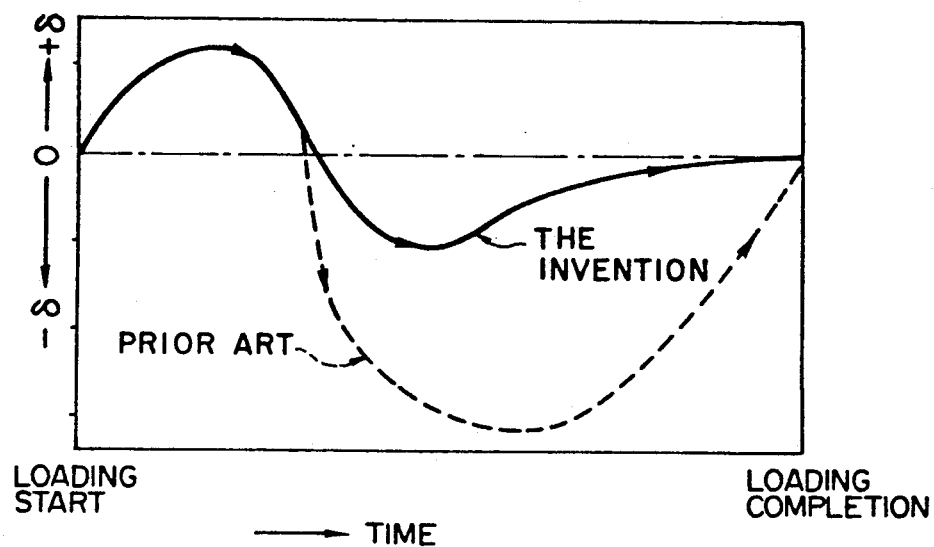
FIG. 8a is a graph showing maximum values of deviation in height of the magnetic tape which occur at the tape guides in the tape loading process.

FIG. 8a shows the geometrically calculated changes in the deviation of the center-height of the tape from the center-heights of the tape guides during the whole process of tape loading. The axis of ordinate represents the tape height deviation and the axis of abscissa represents the process of tape loading. The valued plotted for each loading process are the maximum values of height deviation within the tape guides in contact with the magnetic tape from the supply reel to the take-up reel in the tape cassette. It is ideal that the tape height deviation δ is zero for the whole process of tape loading. However, this is impossible to realize because there are many restrictions in the mechanism.

Figure 8B:
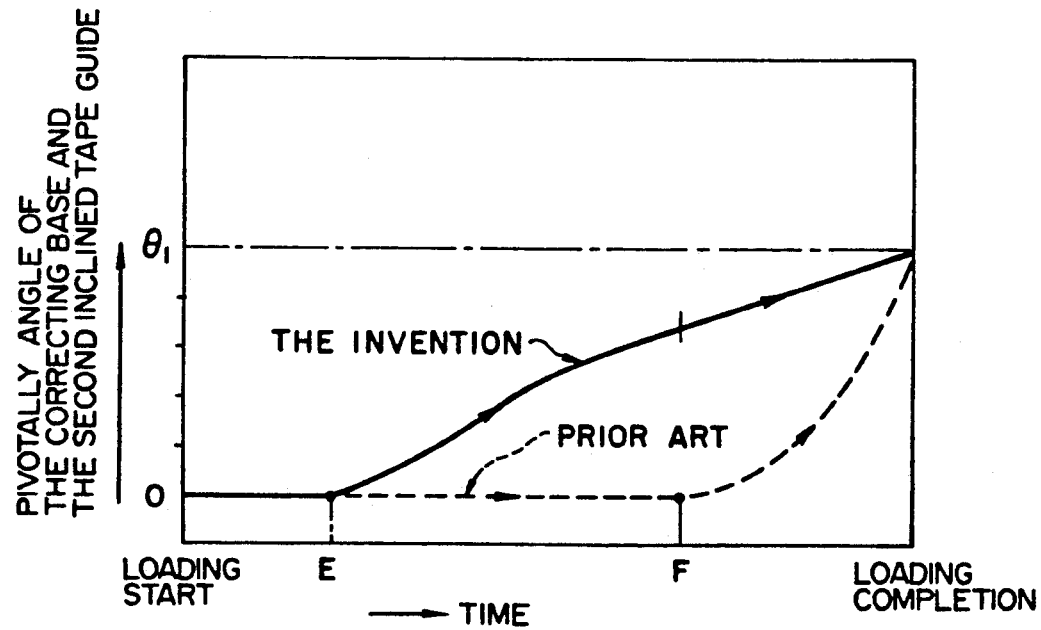
FIG. 8b is a graph showing the rotating timing of the correcting base and the second inclined tape guide.

In the mechanism of the prior art, as shown in FIG. 8b, after the other tape guides reached the predetermined position (point F), the tape guides on the correcting base begin to turn and after they have turned for a predetermined angle (θ), a tape running path is formed as indicated by the broken line.

In this case, however, a considerable deviation of the magnetic tape 14 occurs as indicated by the broken line in FIG. 8a. In contrast, in the embodiment of the invention, as shown by the solid line in FIG. 8b, the turning movement of the correcting base 1 is started before the other tape guides reach the tape loading complete position (point E) and is smoothly varied so that the deviation of the magnetic tape 14 becomes minimum at any point during the whole tape loading process. As a result, it is possible to substantially reduce the height deviation of the tape as shown by the solid line in FIG. 8a. What governs the loaded condition of the magnetic tape 14 from the tape cassette 11 by the above-mentioned tape guides on the outgoing-side base 27 is the winding angle of the tape at the second inclined tape guide 25 on the correcting base 1. In order to reduce the height deviation δ of the tape in each tape guide as shown in FIG. 8a, it is necessary to complete tape winding about the second inclined the guide 25 at an earliest possible stage in the tape loading process.

Figure 9:
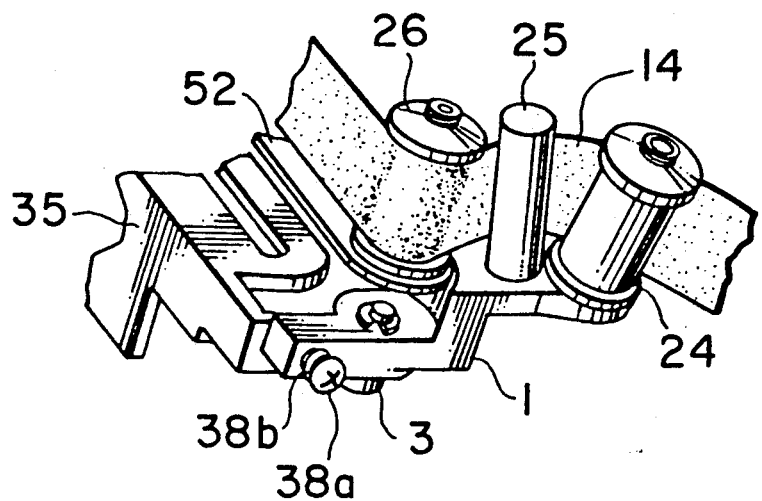
FIGS. 9 and 10 are a perspective view and a plan view of the second outgoing-side tape pull-out guide means, respectively.
Figure 10:
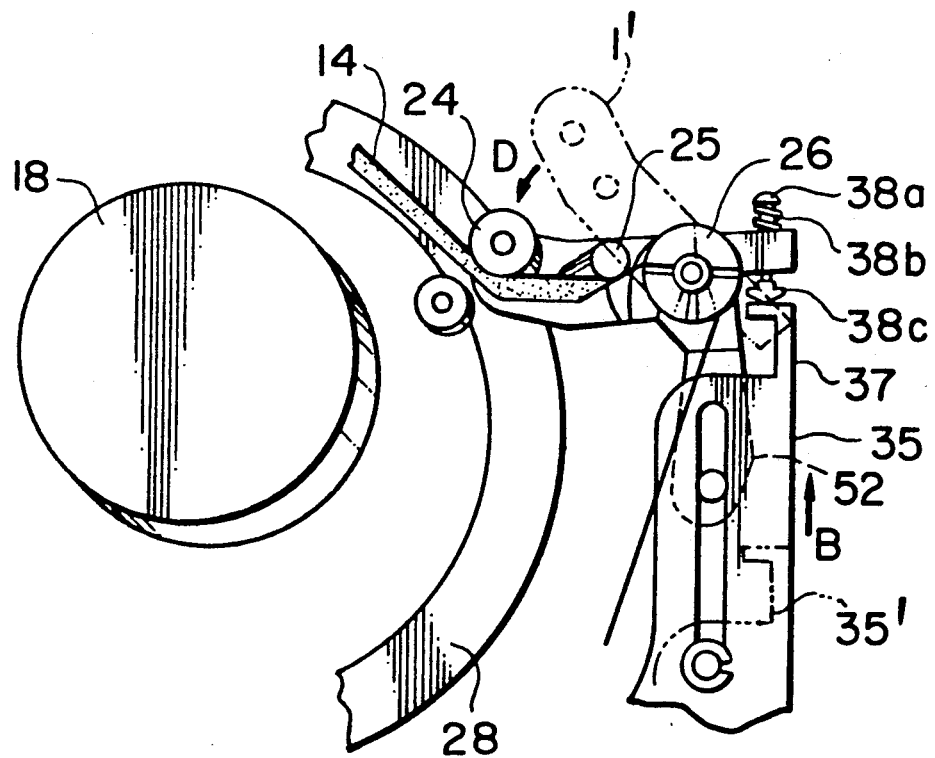
Figure 11:
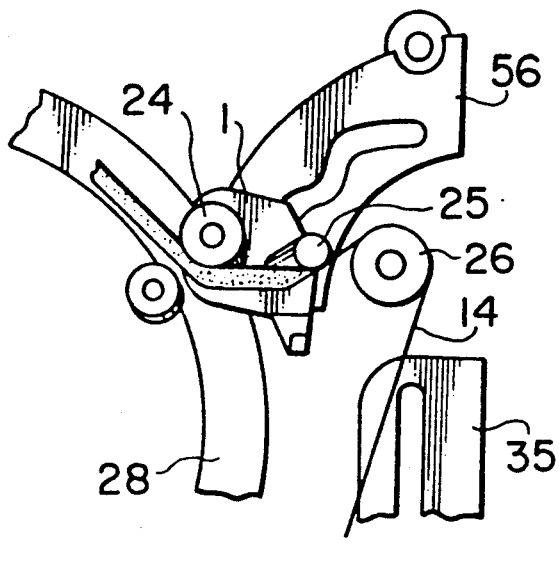
FIG. 11 is a plan view of a modification of the second outgoing-side tape pull-out guide means.

As shown in FIGS. 9 and 10, by setting a shaft 3 of the correcting base 1 coaxially with the center axis of the tape guide 26, a relative positional relation of the outgoing-side correction height regulating guide 24, the second inclined tape guide 25 and the outgoing-side tape guide 26 on the correcting base 1 can be kept constant without being subject to any change by the turning of the correcting base 1 in the process of tape loading. That is, the attitude and position of the tape guides 24, 25 is kept at a constant with respect to the tape guide 26 without being affected by the rotation of the correcting base 1. Therefore, the attitude of the magnetic tape 14 is kept in a geometrically stable condition with little twist between the tape guides 24, 25, 26 and between the tape guide 26 and the take-up reel 13.

The other modifications of the invention will now be described with reference to FIGS. 11 through 13b. In the embodiment described above, the correcting base 1 is turned about the shaft 3, thereby the outgoing-side correction height regulating tape guide 24 and the second inclined tape guide 25 being located, while in a modification shown in FIG. 11, a guide plate 56 is used for this purpose. By forming the guide plate 56 in an adequate shape according to changes in the attitude of the magnetic tape 14 in the process of tape loading, the winding angle of the tape at the second inclined tape guide 25 can be set at an optimum value in the process of tape loading like in the embodiment described above.

In the first embodiment, the first inclined tape guide 23 is fixed on the outgoing-side base 27 and they are moved together.

Figure 12:
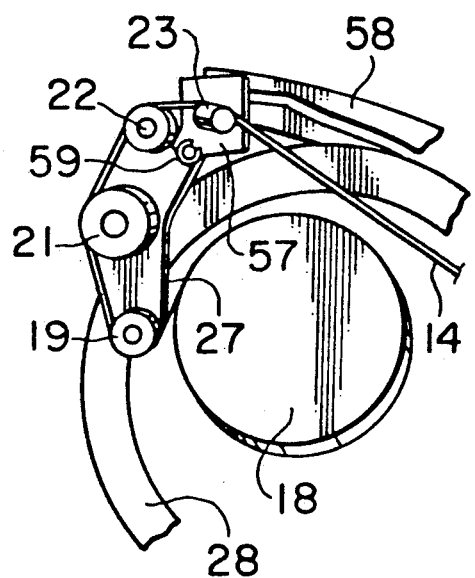
FIG. 12 is a plan view of a modification of the first outgoing-side tape pull-out guide means.

On the other hand, in another modification shown in FIG. 12, an inclined tape guide base 57 rotatable about a shaft 59 on the outgoing-side base 27 is provided on the outgoing-side base 27, and the inclined tape guide base 57 is moved along a guide plate 58 provided outside the loading ring 28, making it possible to adequately set the tape winding angle for the first inclined tape guide 23. Also in this modification, it is possible to reduce the deviation of the height of the tape at each of the tape guides.

Figure 13A:
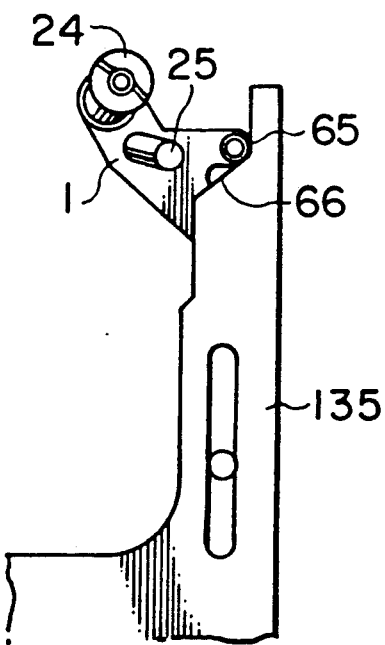
Figure 13B:
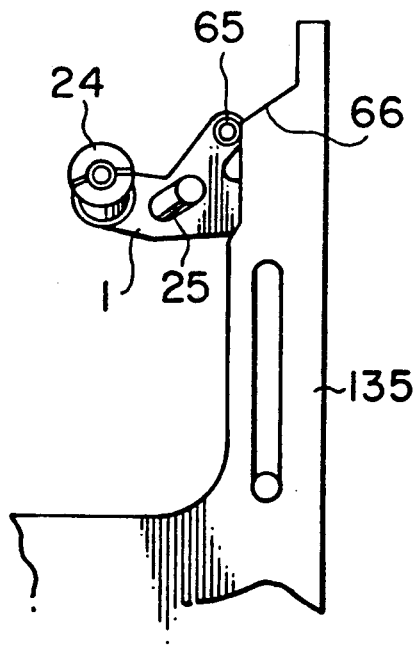

In other modification shown in FIGS. 13a and 13b, an auxiliary base plate 135 having a cam 66 formed at an extreme end thereof is used, while in the embodiment, the protruding portion at the extremity of the auxiliary base plate 35 is used to push the turning-movement adjusting member provided at the end of the correcting base 1, thereby turning the correcting base 1. More specifically, in the modification, the cam 66 is formed at the edge of the auxiliary base plate 135, and a roller 65 is provided on the correcting base 1 and is kept in contact with the surface of the cam 66. The correcting base 1 is turned according to the movement of the auxiliary base plate 135. Thus, the tape winding angles during tape loading for the outgoing-side correction height regulating tape guide 24 and the second inclined tape guide 25 can be easily and suitably set. The arrangement according to the modification provides the stabilizing effects on the tape attitude like in the embodiment described above. Description has been made of the loading process in which the magnetic tape is pulled out of the cassette and wound around the cylinder. In the unloading process in which the tape wound around the cylinder is unwound and brought back into the cassette, the steps of the loading process are reversed.

In the embodiment described above, an example of VTR has been described, but the invention is not limited to this application and can be applied to the control of tape position in magnetic recording and reproducing devices in general.

What is claimed is:

1. A tape loading mechanism for a magnetic recording and reproducing device to pull out a magnetic tape from a tape cassette containing the magnetic tape and to wind the magnetic tape for a predetermined winding angel around a rotating cylinder having a rotating head mounted thereon, comprising:
   an incoming-side tape pull-out guide means for pulling out the magnetic tape from the tape cassette to form an incoming-side portion of a tape running path located between a tape incoming side of the rotating cylinder and the tape cassette during loading the tape, said incoming-side tape pull-out guide means having a plurality of tape guides which are inserted into an opening of the tape cassette to engage a base side of the magnetic tape;
   a first outgoing-side tape pull-out guide means for pulling out the magnetic tape from the tape cassette and winding the tape around the rotating cylinder during loading the tape, said first outgoing-side tape pull-out guide means having a first inclined tape guide to change the running direction of the magnetic tape upwardly; and
   a second outgoing-side tape pull-out guide means for forming an outgoing-side portion of the tape running path between a tape outgoing side of the rotating cylinder and the tape cassette during loading of the tape in cooperation with said first outgoing-side tape pull-out guide means, said second outgoing-side tape pull-out guide means having a second inclined tape guide which is always located outside the tape cassette, such that during loading the second inclined tape guide movably engages a magnetic surface side of the magnetic tape, running from the first inclined tape guide means, to return the running direction of the tape to the height of the tape cassette.

2. The tape loading mechanism according to claim 1, wherein said second outgoing-side pull-out guide means is structured so as to reach the tape loading finished position before said incoming-side tape pull-out guide means and said first outgoing-side tape pull-out guide means reach the tape loading finished position.

3. A tape loading mechanism for a magnetic recording and reproducing device to pull out a magnetic tape from a tape cassette containing the magnetic tape and to wind the magnetic tape for a predetermined winding angle around a rotating cylinder having a rotating head mounted thereon, comprising:
   an incoming-side tape pull-out guide means for pulling out the magnetic tape from the tape cassette to form an incoming-side portion of a tape running path located between a tape incoming side of the rotating cylinder and the tape cassette during loading the tape, said incoming-side tape pull-out guide means having a plurality of tape guides which are inserted into an opening of the tape cassette to engage a base side of the magnetic tape;
   a first outgoing-side tape pull-out guide means for pulling out the magnetic tape from the tape cassette and winding the tape around the rotating cylinder during loading the tape, said first outgoing-side tape pull-out guide means having a first inclined tape guide to change the running direction of the magnetic tape upwardly; and
   a second outgoing-side tape pull-out guide means for forming an outgoing-side portion of the tape running path between a tape outgoing side of the rotating cylinder and the tape cassette during loading of the tape in cooperation with said first outgoing-side tape pull-out guide means, said second outgoing-side tape pull-out guide means having a second inclined tape guide which is located outside the tape cassette, such that during loading the second inclined tape guide movably engages a magnetic surface side of the magnetic tape, running from the first inclined tape guide means, to return the running direction of the tape to the height of the tape cassette,
   wherein said second outgoing-side pull-out guide means includes a vertical tape guide to change the running direction of the magnetic tape towards the tape cassette, and,
   wherein the second inclined tape guide is pivotally arranged about a shaft disposed coaxially with the vertical tape guide.

4. The tape loading mechanism according to claim 3, wherein the second inclined tape guide is connected and pivoted upon an auxiliary base plate, and wherein said auxiliary base plate moves the tape cassette mounted thereon to the rotating cylinder.

* * * * *

UNITED STATES PATENT AND TRADEMARK OFFICE
CERTIFICATE OF CORRECTION

PATENT NO. : 5,124,862

DATED : June 23, 1992

INVENTOR(S) : Toshiyasu Sawano, et al.

It is certified that error appears in the above-identified patent and that said Letters Patent is hereby corrected as shown below:

Claim 1, column 9, line 20, delete "angel" and replace with --angle--.

Signed and Sealed this

Twentieth Day of July, 1993

Attest:

MICHAEL K. KIRK

*Attesting Officer*       *Acting Commissioner of Patents and Trademarks*